April 15, 1930. W. C. KINNIE 1,754,518
VENDING CABINET
Filed Oct. 22, 1926 2 Sheets-Sheet 1
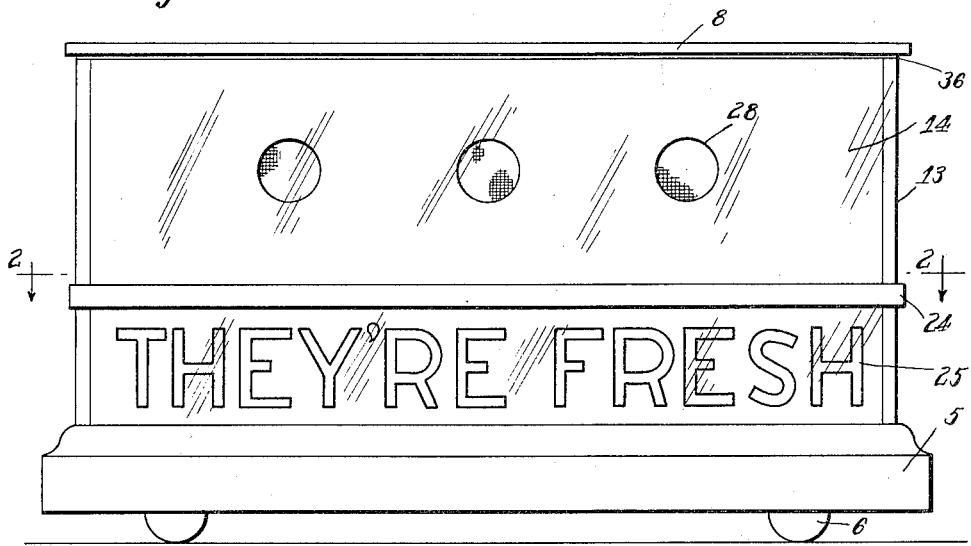
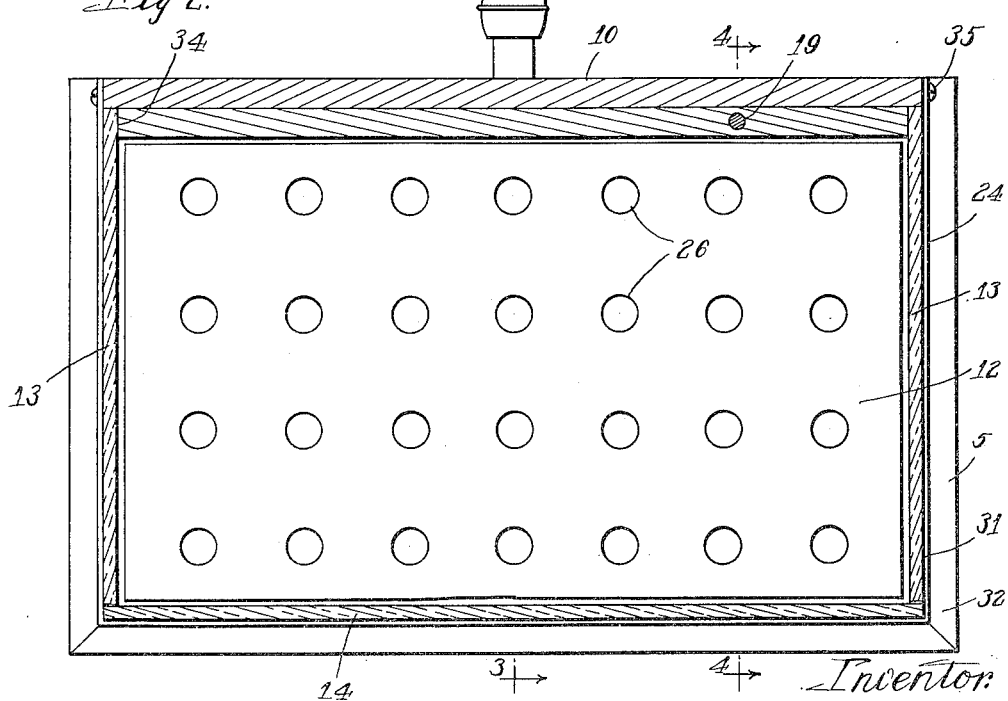

April 15, 1930. W. C. KINNIE 1,754,518
VENDING CABINET
Filed Oct. 22, 1926 2 Sheets-Sheet 2

Inventor:
W. Carl Kinnie
By Wilson & McCanna
Attys.

Patented Apr. 15, 1930

1,754,518

UNITED STATES PATENT OFFICE

W. CARL KINNIE, OF ROCKFORD, ILLINOIS, ASSIGNOR TO F. H. WARD CO., OF ROCKFORD, ILLINOIS, A FIRM COMPOSED OF HATTIE B. KINNIE

VENDING CABINET

Application filed October 22, 1926. Serial No. 143,368.

This invention relates to a novel vending cabinet especially designed for the attractive display for sale of nuts or other products and for the keeping thereof in wholesome and nutritious condition.

The cabinet of the present invention provides a display rack therein on which the nuts in tissue wrappers may be placed to be removed by the customer after raising the lid, the raising of the lid being arranged through a novel means in connection therewith to sound a bell or other alarm to apprise the shop keeper so that there is little or no chance of his sustaining losses through theft.

The cabinet also provides, in conjunction with an electric display light, preferably flashing on and off to attract the attention of prospective customers and serving to provide the desired warmth in the cabinet to keep the nuts free from moisture and in an appetizing condition, a number of air inlet and outlet openings to insure a circulation of pure fresh air which is found to be highly beneficial in preserving the flavor of the nuts. The warmth and light within the cabinet has a tendency to attract insects and, for this reason, I provide the ventilation openings with screen covering so that the cabinet may be rendered insect proof, there being no other openings through which insects could possibly enter.

These and still other features of the present invention having to do with matters of construction or arrangement will be described in detail in the course of the following specification wherein reference is made to the accompanying drawings, in which—

Figure 1 is a front view of a vending cabinet made in accordance with my invention;

Fig. 2 is a horizontal section taken on the line 2—2 of Fig. 1; and

Figure 3:
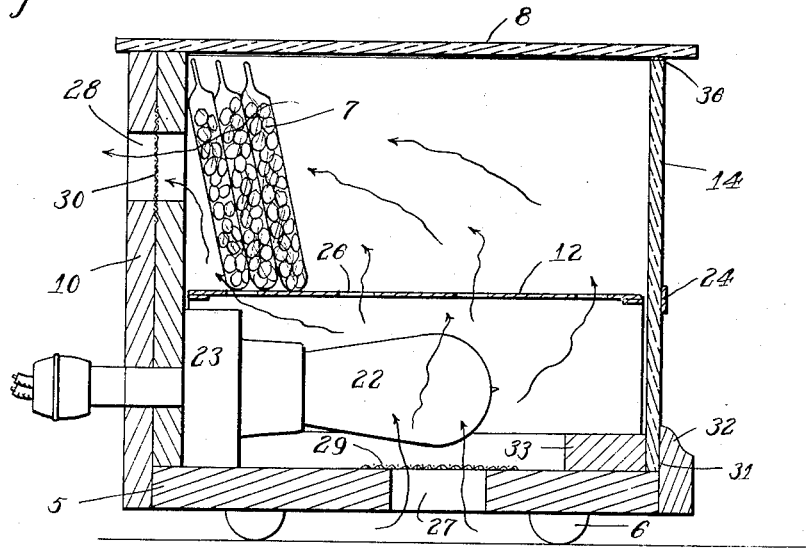
Figure 4:
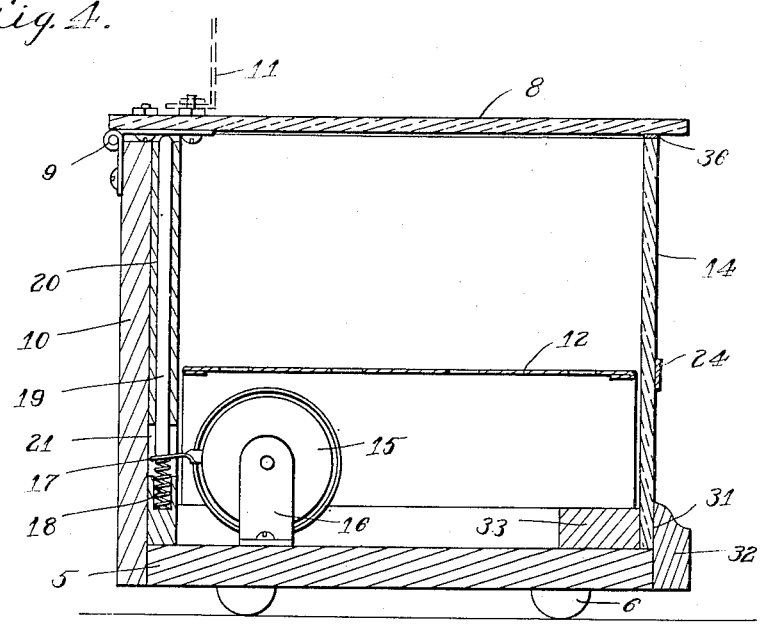

Figs. 3 and 4 are vertical cross sections taken on the lines 3—3 and 4—4 of Fig. 2.

The same reference numerals are applied to corresponding parts throughout the views.

The cabinet comprises a wooden base 5 having rubber knobs 6 on the under side thereof to support the cabinet slightly raised from a show case or other convenient support on which it may be placed. The intention is to have the cabinet easily accessible to the customer who may help himself to wrappers of nuts 7 contained therein. The lid 8, hinged as at 9 to the wooden back 10, may be raised by the customer from in front of the cabinet. A sign 11 is suitably fastened to the top of the lid to designate the different varieties of nuts suitably arranged in rows on the rack 12 within the cabinet. The lid 8 is preferably of glass, as are also the side walls 13 and the front wall 14, so that the contents of the cabinet are visible from practically all sides. In the raising of the lid, the customer causes the sounding of a bell 15 which attracts the attention of the shop keeper, who then approaches and collects the amount of the sale, so that there is no chance of his sustaining loss through theft. The bell 15 is mounted on a bracket 16 in a concealed place, as for example, beneath the rack 12 inside the cabinet, and is preferably of the type commonly used on bicycles which have a finger piece or other actuating element 17 projecting therefrom, as shown. In its application in the cabinet, the finger piece 17 is arranged to be operated by a compression spring 18 and a plunger 19 engaging opposite sides thereof. The plunger 19 and spring 18 are concealed in a hole 20 drilled from the upper end of the back wall 10. The finger piece 17 projects into an opening 21 in between the spring 18 and plunger 19. The upper end of the plunger 19 is rounded, as shown, and rides against the inside of the lid proper or against one leaf of the hinge 9 fastened thereto. Obviously, in the raising of the lid 8 sufficiently to remove a wrapper of nuts, the customer will unwittingly sound the alarm and is not likely to do this without attracting the attention of the shop keeper. In the raising of the lid, the spring 18 actuates the finger piece 17 and, on the closing of the lid, the plunger 19 repeats the operation. There are thus two distinct alarms sounded which are not apt to go unnoticed.

The cabinet has a display light 22 mounted therein beneath the tray 12. The socket 23 for this light has a thermostatic unit therein of any of the standard, well-known types arranged to cause the light to flash on and off and thereby attract attention to the goods displayed in the cabinet. The lower portion of the glass walls 13 and 14, beneath a band 24, is rendered opaque with the exception of a display sign, such as that indicated at 25, which will be illuminated each time the light flashes on. The contents of the cabinet is also illuminated since the tray 12 has rows of openings 26 therein through which the light will pass. The light 22 also furnishes sufficient heat to keep the contents of the cabinet thoroughly free from moisture from without by drying the incoming fresh air. The heat, however, is not sufficient to impair the flavor of the nuts by drying out the oils therein, as will be readily apparent. On the contrary, nuts displayed in a cabinet constructed in the manner shown are found to have their natural flavor preserved and to be wholesome and nutritious. Their flavor is furthermore preserved by avoiding the presence of stale air in the cabinet. Air is circulated through the cabinet, as indicated by the arrows in Fig. 3. It enters through an inlet opening 27 in the base 5, the base 5 being sufficiently elevated due to the knobs 6, as previously mentioned, to permit air to pass underneath the cabinet. The entering air is heated by contact with the light 22 which, it will be noted, is disposed directly over the opening 27. The heated air rises through the openings 27 and circulates about the wrappers of nuts 7 and finally leaves the cabinet through a number of outlet openings 28. Due to the circulation described, it is obviously impossible for the air in the cabinet to become stale. It has been found that the warmth and the light are both attractive to insects generally and, for this reason, I prefer to provide screen covering for the openings 27 and 28, as shown at 29 and 30 respectively. As there are no other openings leading into the cabinet through which the insects could possibly enter, the cabinet is rendered absolutely insect proof by this precautionary measure.

In the construction of the glass-enclosed portion of the cabinet, I have avoided as far as possible the use of fastenings entering the parts of glass. It will be noted that the sides 13 and front 14 are set in a marginal recess 31 provided in the base 5 between a bordering trimming strip 32 on the outside of the cabinet and strips 33 within the cabinet. The side pieces 13 also engage in a rabbet 34 provided at the ends of the back wall 10. The band 24, previously referred to, is fastened to the back wall 10 at 35 and extends from one end of the back wall to the front of the cabinet, across the front of the cabinet to the other end thereof, and rearwardly to the back of the cabinet, the band being fastened at opposite ends to the two ends of the back wall, as shown. The construction is obviously vary simple and avoids the likelihood of the glass becoming cracked. The walls 13 and the front wall 14 also preferably have the upper edges thereof provided with strips of felt, as indicated at 36, to cushion the engagement of the lid 8 therewith. This is merely another precaution against the likelihood of the glass being broken or cracked in service.

I claim:

1. A vending cabinet comprising a case having the bottom and back walls thereof of opaque material such as wood, said bottom wall providing a marginal recess along the front and along the two ends of said case, and said back wall providing a rabbet extending the height of the case at the two ends thereof in alignment with the aforesaid recess, glass enclosure walls for the front and two sides of said case, the two side pieces engaging in said recess at the ends of said case and also in said rabbets while the front piece engages the ends of the side pieces and also is seated in the recess along the front of the case in said bottom wall, a single band piece fastened to the back wall and extending along the sides and across the front of the case to hold the glass enclosure pieces in place without necessitating fastening through the glass pieces, and a top for said case.

2. In a cabinet substantially as set forth in claim 1 wherein the back wall is made of two plies of material, the inner ply being shorter than the outer ply so as to form the rabbets at the two ends extending the height of the case for the purpose specified, the provision of registering holes in said plies for ventilation of the case, and screen for said holes disposed between the plies and suitably secured in place.

In witness of the foregoing I affix my signature.

W. CARL KINNIE.